UNITED STATES PATENT OFFICE.

JOEL CHRISTOPHER DOOLEY, OF DES MOINES, IOWA.

INSECTICIDE AND DISINFECTANT.

970,434.  Specification of Letters Patent. Patented Sept. 13, 1910.

No Drawing.   Application filed November 26, 1909. Serial No. 530,066.

*To all whom it may concern:*

Be it known that I, J. C. DOOLEY, a citizen of the United States, residing at Des Moines, county of Polk, Iowa, have invented a new and useful composition of matter to be used for the repelling and extermination of insects and as a powerful disinfectant for sanitary treatment in bringing about conditions best suited to the enjoyment of health.
My composition consists of the following ingredients, combined in the proportions herein stated, namely:

| | |
|---|---|
| Kerosene | 160 gallons. |
| Gasolene | 40 gallons. |
| Naphthalene | 40 pounds. |
| Carbolic acid | 5 gallons. |
| Nitrobenzole, oil of mirbane | 2½ gallons. |
| Sulfurous acid, an aqueous solution of sulfur dioxid, strength 5% to 7% | 2½ gallons. |
| Spirits of turpentine | 2½ gallons. |

The above composition is nonexplosive and otherwise harmless to human beings, and may be used on the finest wearing apparel, carpets, rugs, and drapery, also wallpapering, furniture, etc., without affecting coloring or finish or leaving any stain or blearing. It is a repellant and sure destroyer of insects as a class and of their eggs, but is especially suited for the extermination of bedbugs, roaches, ants, moths, chicken lice or mites, fleas, flies, mosquitos, etc., and for sheep ticks, or lice on animals of any description, as well as head lice or body lice on human beings; also all bugs, including the potato-beetle, and worms or other insects infesting all kinds of plants, gardens or truck-patches, shrubs and fruits of every description, including roses, gooseberry and currant bushes, vineyards, orchards, etc. The composition is also an effectual disinfectant, where sanitary treatment is called for by boards of health or by other officials, by hospitals, sanitariums, etc., also for toilets, vaults and sewerage. It likewise performs this function in every treatment for the repelling or extermination of insects in all human habitations.

A hand or power sprayer is the best means of applying this preparation on all objects to be treated, and especially for insect repelling or extermination; while in using as a disinfectant it may be sprinkled or poured, and applied in other ways of using liquid disinfectants.

I am aware that different ones of the ingredients named herein have been used severally, or by combining two or more, as insecticides and for disinfecting purposes; but I am not aware that all of the ingredients of my composition have been used together in any former production.

Hence in view of these respective ingredients used and the proportions thereof, I claim:

The herein described composition of matter for disinfecting, and for the repelling and extermination of insects, consisting of kerosene one hundred and sixty gallons, gasolene forty gallons, naphthalene forty pounds, carbolic acid five gallons, nitrobenzole two and a half gallons, spirits of turpentine two and a half gallons, a 5% to 7% aqueous solution of sulfur dioxid two and a half gallons, substantially as described.

In testimony whereof I have hereunto signed my name.

JOEL CHRISTOPHER DOOLEY.

Witnesses:
 JOHN OSTRAND,
 WALTER BYRON DOOLEY.